(12) United States Patent
Ishige et al.

(10) Patent No.: US 8,913,057 B2
(45) Date of Patent: Dec. 16, 2014

(54) INFORMATION PROCESSING DEVICE, INFORMATION PROCESSING METHOD, AND PROGRAM

(75) Inventors: Hiroyuki Ishige, Tokyo (JP); Kazuhiro Suzuki, Tokyo (JP); Akira Miyashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 389 days.

(21) Appl. No.: 13/023,815

(22) Filed: Feb. 9, 2011

(65) Prior Publication Data

US 2011/0216961 A1    Sep. 8, 2011

(30) Foreign Application Priority Data

Mar. 4, 2010    (JP) ................. 2010-048095

(51) Int. Cl.
| | | |
|---|---|---|
| G06T 1/00 | (2006.01) | |
| G06T 15/00 | (2011.01) | |
| G06T 17/00 | (2006.01) | |
| G09G 5/00 | (2006.01) | |
| G06K 9/00 | (2006.01) | |
| G06K 9/54 | (2006.01) | |
| G06K 9/60 | (2006.01) | |
| G06F 3/00 | (2006.01) | |
| G06F 17/00 | (2006.01) | |
| G06F 19/00 | (2011.01) | |

(52) U.S. Cl.
CPC .. G06K 9/00 (2013.01); G06T 15/00 (2013.01)
USPC ........... 345/419; 345/418; 345/420; 345/619; 345/620; 345/621; 345/622; 345/629; 345/630; 345/632; 345/633; 345/642; 382/145; 382/305; 715/848; 715/849; 715/850; 715/851; 715/852; 463/30; 463/31; 463/32; 463/33

(58) Field of Classification Search
CPC ......... G06T 11/00; G06T 11/40; G06T 11/60; G06T 15/005; G06T 15/30; G06T 15/405; G06T 17/20; G06T 19/00; A63F 13/10; G06F 3/04815
USPC ......... 345/632, 633, 418–420, 619–622, 629, 345/630, 642; 382/145, 305; 715/848–852; 463/30–33
See application file for complete search history.

(56) References Cited

U.S. PATENT DOCUMENTS

| | | | | |
|---|---|---|---|---|
| 4,739,401 A | * | 4/1988 | Sacks et al. .................... | 382/103 |
| 2006/0227151 A1 | * | 10/2006 | Bannai ........................... | 345/633 |
| 2008/0304707 A1 | | 12/2008 | Oi et al. | |
| 2009/0009536 A1 | * | 1/2009 | Redert et al. .................. | 345/667 |
| 2011/0172917 A1 | * | 7/2011 | Muzina et al. ................ | 701/212 |

FOREIGN PATENT DOCUMENTS

JP    2008-304268    12/2008

OTHER PUBLICATIONS

U.S. Appl. No. 13/131,831, filed May 27, 2011, Miyashita, et al.

* cited by examiner

*Primary Examiner* — Ke Xiao
*Assistant Examiner* — Jed-Justin Imperial
(74) *Attorney, Agent, or Firm* — Oblon, Spivak, McClelland, Maier & Neustadt, L.L.P.

(57) ABSTRACT

There is provided an information processing device includes a virtual space recognition unit for analyzing 3D space structure of a real space to recognize a virtual space, a storage unit for storing an object to be arranged in the virtual space, a display unit for displaying the object arranged in the virtual space, on a display device, a detection unit for detecting device information of the display device, and an execution unit for executing predetermined processing toward the object based on the device information.

14 Claims, 17 Drawing Sheets

FIG. 14
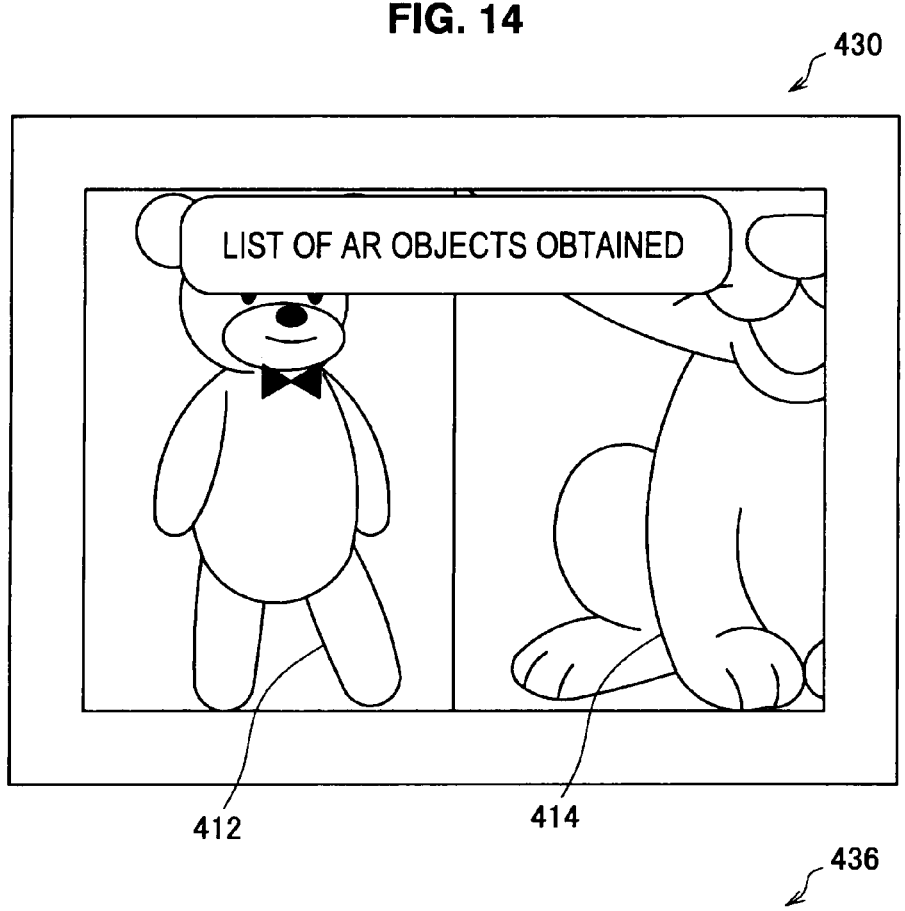
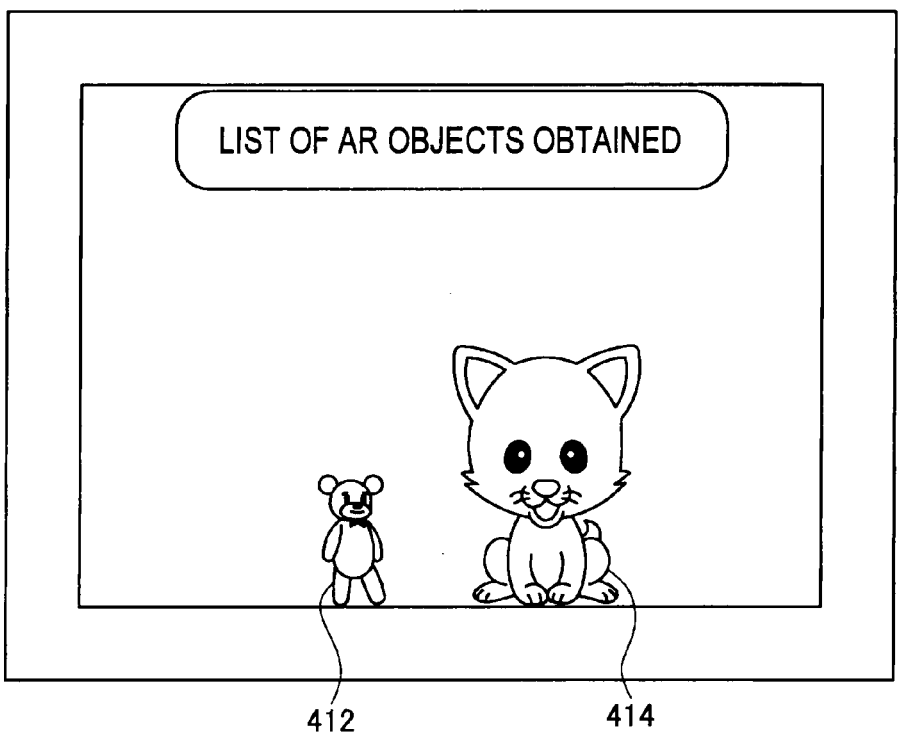

INFORMATION PROCESSING DEVICE, INFORMATION PROCESSING METHOD, AND PROGRAM

BACKGROUND OF THE INVENTION

1. Field of the Invention

The present invention relates to an information processing device, an information processing method, and a program, and more particularly, to an input/output of objects in augmented reality space.

2. Description of the Related Art

Recently, as an example of the augmented reality technology (hereinafter, referred to as an AR technology), virtual digital information (virtual object) is displayed to be superimposed on real space information such as a real-space image. To superimpose virtual digital information on real space information, it is necessary to recognize position information and posture information between an object on real space and a virtual object.

For example, a technology for matching location information and posture information between an object on real space and a virtual object by a simple adjustment has been disclosed (for example, refer to Japanese Unexamined Patent Application Publication No. 2006-48639). Japanese Unexamined Patent Application Publication No. 2006-48639 discloses a technology that matches location information and posture information between an object on real space and a virtual object by causing a user to specify location of the object on real space corresponding to predetermined location of the virtual object.

SUMMARY OF THE INVENTION

However, Japanese Unexamined Patent Application Publication No. 2006-48639 has an issue that it is necessary for a user to specify a position and a size of the virtual object, and that it is difficult to intuitively arrange or remove the virtual object in the virtual space.

Therefore, in view of the aforementioned issues, the present invention provides an information processing device, an information processing method, and a program, which are novel and improved, and which are capable of intuitively inputting/outputting a virtual object to a virtual space recognized by analyzing a real space.

According to an embodiment of the present invention, there is provided an information processing device including a virtual space recognition unit for analyzing 3D space structure of a real space to recognize a virtual space, and for obtaining position information of a device in the virtual space, a storage unit for storing an object to be arranged in the virtual space and position information of the object, a display unit for displaying the object arranged in the virtual space, on a display device, a detection unit for detecting device information of the display device, and an execution unit for executing predetermined processing toward the object based on the device information.

The detection unit may detect correspondence relationship between the position information in the virtual space obtained by the virtual space recognition unit, and the position information of the object stored in the storage unit. The execution unit may execute predetermined processing toward the object depending upon a state of the correspondence relationship detected by the detection unit.

The information processing device may include an issuance unit for issuing a command to cause the execution unit to execute predetermined processing depending upon a user's operation. The execution unit may execute the predetermined processing depending upon the command issued by the issuance unit.

The execution unit may input the object in the virtual space based on the device information.

The execution unit may input the object in the virtual space by arranging the object in the virtual space.

The detection unit may detect posture information of the display device on the virtual space, and the execution unit may arrange the object in that the posture information of the display device has been reflected, in the virtual space.

The execution unit may output the object, which has been input in the virtual space, from the virtual space based on the device information.

The execution unit may output the object from the virtual space by removing the object arranged in the virtual space from the virtual space.

The execution unit may output the object from the virtual space by displaying the object arranged in the virtual space, in a predetermined size in the real space.

The execution unit may display the object arranged in the virtual space, in the real space in a size corresponding to a size in the virtual space.

According to another embodiment of the present invention, there is provided an information processing method including the steps of analyzing 3D space structure of a real space to recognize a virtual space, arranging an object in the virtual space, detecting a device information of a display device that displays the virtual space, and executing predetermined processing toward the object based on the device information.

According to another embodiment of the present invention, there is provided a program for causing a computer to function as an information processing device including a virtual space recognition unit for analyzing 3D space structure of a real space to recognize a virtual space, and for calculating position information of a device, a storage unit for storing an object to be arranged in the virtual space, a display unit for displaying the object arranged in the virtual space, on a display device, and a detection unit for detecting a correspondence relationship between a position of the object to be arranged in the virtual space and a position of the device, and an execution unit for executing predetermined processing toward the object based on the device information.

As described above, according to the present invention, it is possible to intuitively input/output a virtual object to a virtual space recognized by analyzing a real space.

BRIEF DESCRIPTION OF THE DRAWINGS

FIG. 14 is a diagram for explaining obtaining an AR object according to the present embodiment;

DETAILED DESCRIPTION OF THE EMBODIMENT(S)

Figure 1:
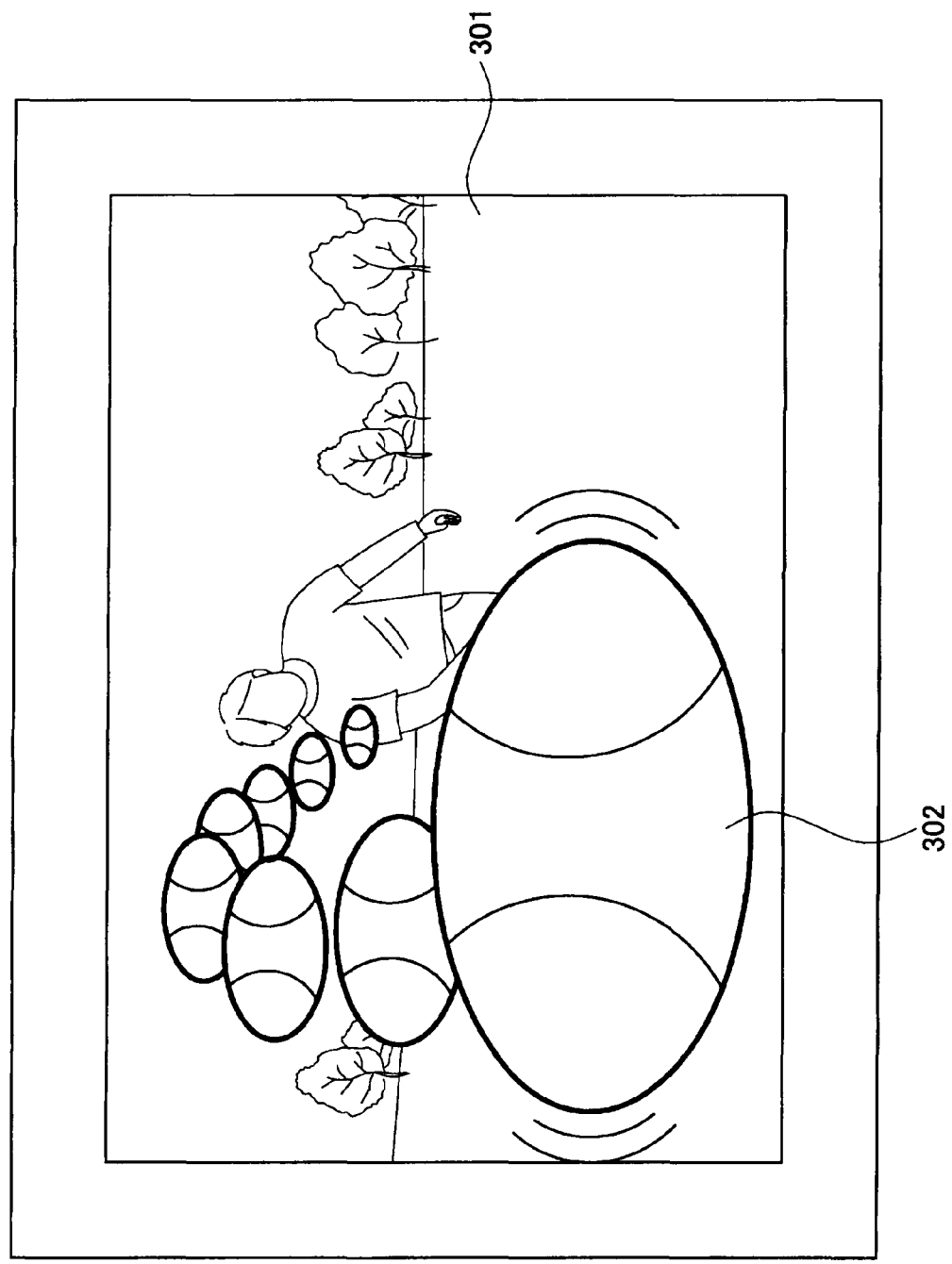
FIG. 1 is a diagram for explaining an AR technology.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In addition, "the best modes of embodiments of the invention" will be described in the following order.

[1] Object of Embodiment
[2] Overview of information processing device
[3] Hardware Configuration of information processing device
[4] Functional Configuration of information processing device
[5] Details of Operations of information processing device
[1] Object of Embodiment At first, an aim of the present embodiment will be explained. Recently, as an example of the AR technology, virtual digital information (virtual object) is displayed to be superimposed on real space information such as a real-space image. When superimposing virtual digital information on real space information, it is necessary to recognize position information and posture information between an object on real space and a virtual object.

For example, a technology for matching location information and posture information between an object on real space and a virtual object by a simple adjustment has been disclosed. Such technology matches location information and posture information between an object on real space and a virtual object by causing a user to specify location of the object on real space corresponding to predetermined location of the virtual object.

The above technology, however, forces the user to specify a position and a size of a virtual object, and there has been an issue that the user cannot intuitively arrange or remove the virtual objects. In light of foregoing, the information processing device 10 according to the present embodiment of the present invention has made. According to the information processing device 10 of the present embodiment, it is possible to input/output intuitively a virtual object into a virtual space which is recognized after analyzing real space.

[2] Overview of Information Processing Device

Hereinbefore, the object of the embodiment was described. Next, the overview of the information processing device 10 is described with reference to FIGS. 1 to 3. An information processing terminal having a display device such as a mobile phone, a Personal Digital Assistant (PDA), a portable game machine, a small-sized Personal Computer (PC), and the like may be exemplified as the information processing device 10. In the information processing device 10, a virtual object which is to be superimposed on the real-space image is registered.

Figure 2:
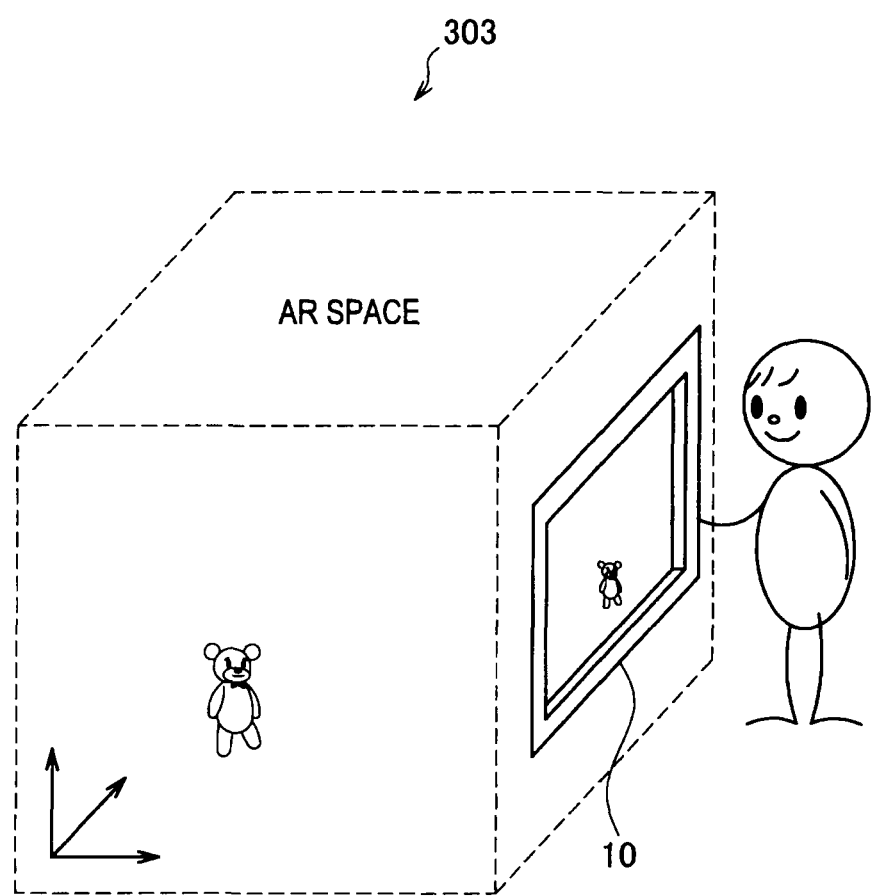
FIG. 2 is a diagram for explaining a virtual space recognized by analyzing a real space.
Figure 3:
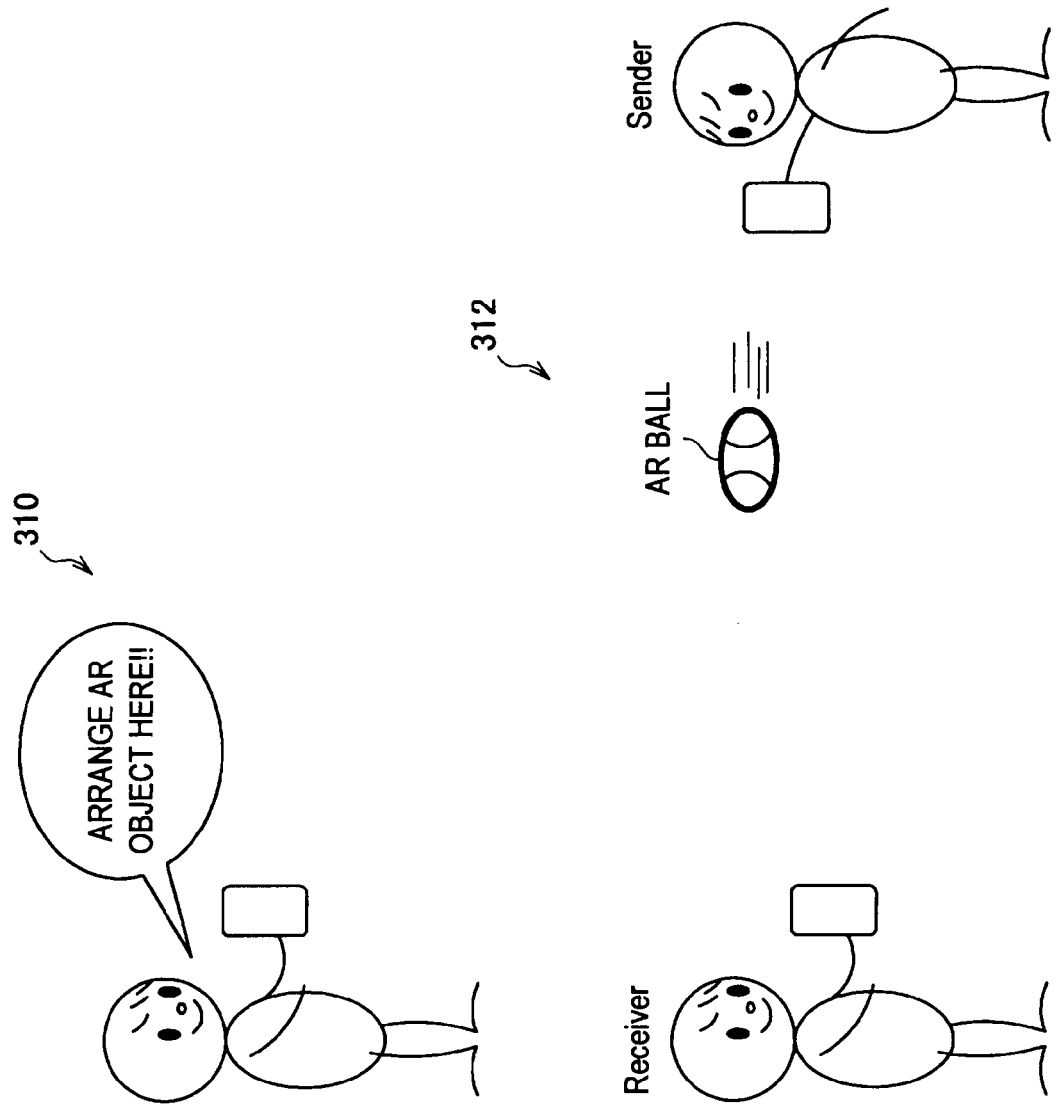
FIG. 3 is a diagram for explaining an intuitive input/output of an AR object to an AR space.

FIG. 1 is a diagram for explaining an AR technology. FIG. 2 is a diagram for explaining a virtual space (AR space) recognized by analyzing a real space. FIG. 3 is a diagram for explaining for explaining an intuitive input/output of an AR object to an AR space.

In FIG. 1, virtual digital information is superimposed on a real-world image 301 in the real world. Accordingly, complementary information can be synthesized and displayed on the real-world image 301. The real-world image 301 is an image in a real space captured by an image capturing device or the like. In addition, the virtual digital information 302 is a virtual object which is obtained by analyzing the real space and is arranged at an arbitrary position in the real space.

For example, in FIG. 1, a ball, as a virtual object, is superimposed on a display screen where a person taking an action of throwing the ball in the real space is displayed. In this manner, in the information processing device 10, a digital image of the ball is synthesized into the image of the person in the real space, so that it may be shown that the person seems to be throwing the ball really.

Next, the virtual space (AR space) recognized by analyzing the real space is described with reference to FIG. 2. FIG. 2 illustrates a state where a virtual object is arranged in the AR space recognized by using the information processing device 10. The AR space is a space where a space coordinate system of a virtual space recognized by analyzing a real space is superposed on a space coordinate system of the real space. This means that, if the position in the real space coordinate system is determined, the coordinate in the AR space is uniquely determined. In other words, in the case where an AR object is arranged at an arbitrary position in the real space, the position at which the AR object is arranged in the AR space is uniquely determined.

The information processing device 10 according to the present embodiment make it possible for a user to arrange intuitively the AR object without specifying a position to be arranged expressly when disposing the AR object arranged in the AR space. For example, as shown in the explanatory view 310 of FIG. 3, the user can arrange the AR object in the AR space intuitively. In addition, the user can obtain a size of the AR object without specifying expressly the size of the arranged AR object. For example, as illustrated in the explanatory view 312 of FIG. 3, when an AR object is arranged in the AR space by a Sender and a Receiver obtains the AR object arranged in the AR space, the AR object of an appropriate size can be obtained without specifying the size of the AR object.

In the present embodiment, the position and the size of the AR object in the AR space is determined according to the position of the main body of the device of the information processing device 10, the size of the display unit of the information processing device 10, or the like. Therefore, even though the user does not specify expressly the position or the size of the AR object, the user can arrange the AR object in an appropriate position comparing the position of the main body of the device and the position of the AR object, obtain an appropriate size of the AR object arranged in the AR space comparing the size of the display unit and the size of the AR object.

[3] Hardware Configuration of Information Processing Device

Figure 4:
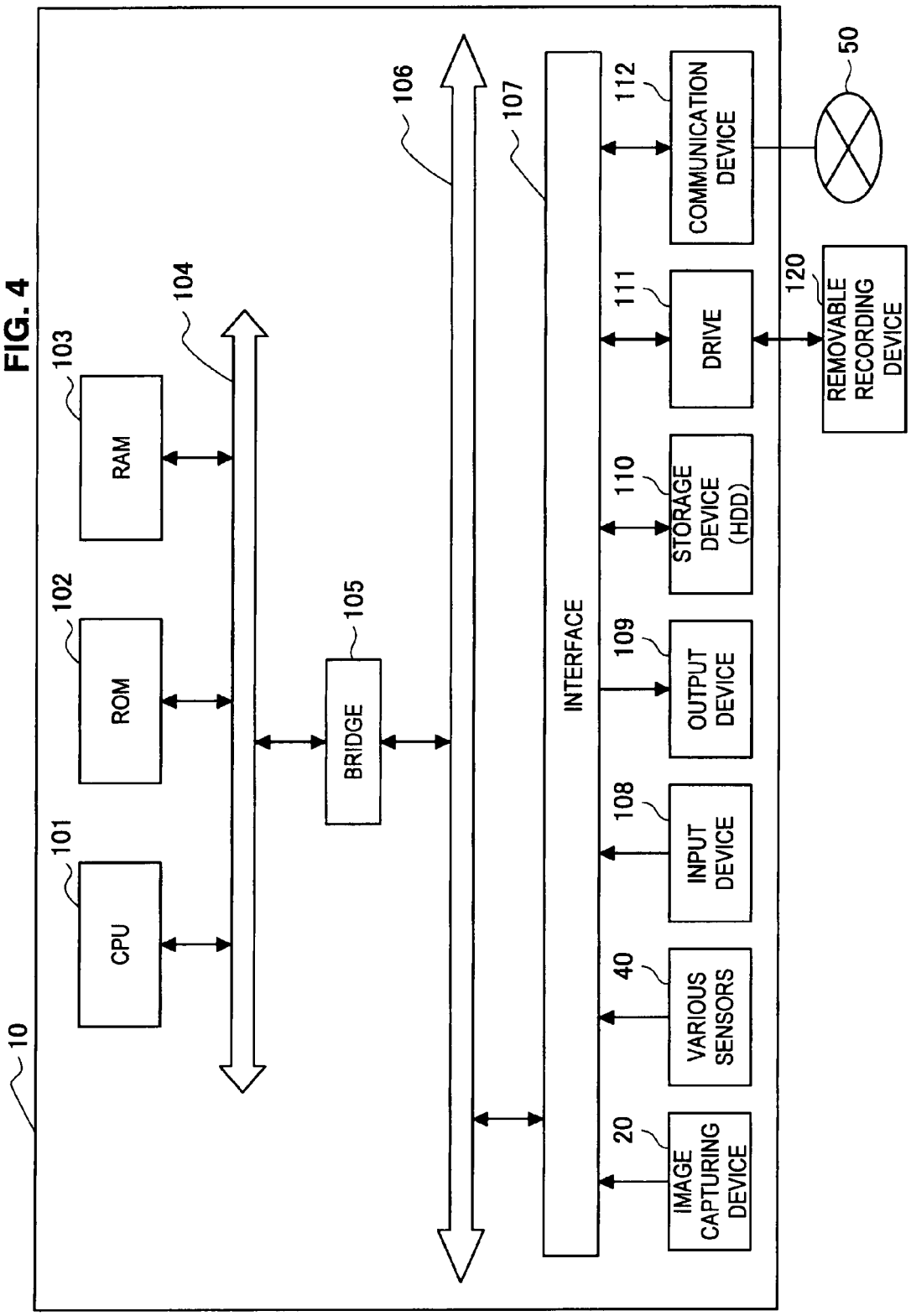
FIG. 4 is a block diagram for illustrating hardware configuration of an information processing device according to the present embodiment.

Hereinbefore, the overview of the information processing device 10 was described. Next, a hardware configuration of the information processing device 10 is described with reference to FIG. 4. FIG. 4 is a block diagram illustrating a hardware configuration of the information processing device 10. The information processing device 10 includes a Central Processing Unit (CPU) 101, a Read Only Memory (ROM) 102, a Random Access Memory (RAM) 103, a host bus 104, a bridge 105, an external bus 106, an interface 107, an input device 108, an output device 109, a storage device (HDD) 110, a drive 111, a communication device 112, an image capturing device 20, and various sensors 40.

The CPU 101 functions as a calculation processing device and a control device to control overall operations of the information processing device 10 according to various programs. In addition, the CPU 101 may be a microprocessor. The ROM 102 stores programs, calculation parameters, or the like used by the CPU 101. The RAM 103 temporarily stores programs used for execution of the CPU 101, parameters appropriately changed in the execution, or the like. These components are connected to each other via a host bus 104 which is constructed with a CPU bus or the like.

The host bus 104 is connected to an external bus 106 such as a Peripheral Component Interconnect/Interface (PCI) bus through a bridge 105. In addition, the host bus 104 is not necessary configured to be separated from the bridge 105 and the external bus 106. The functions of these buses may be embedded in one bus.

The input device 108 is constructed with, for example, an input unit through which a user inputs information, such as a mouse, a keyboard, a touch panel, a button, a microphone, a switch, a lever, or the like, an input control circuit which generates an input signal based on the user's input and outputs the input signal to the CPU 101, and the like. The user of the information processing device 10 can input various types of data or make a command to perform a processing operation with respect to the information processing device 10 by manipulating the input device 108.

The output device 109 is constructed with, for example, a display device such as a Cathode Ray Tube (CRT) display device, a liquid crystal display (LCD) device, an Organic Light Emitting Display (OLED) device, a lamp, or the like and a sound output unit such as a speaker, a headphone, or the like. More specifically, the display device displays various types of information such as reproduced image data as a text or an image. On the other hand, the sound output unit converts the reproduced sound data or the like into sound and outputs the sound. The later-described display device 30 is an example of an output device 109.

The storage device 110 is a device for storing data, which is configured as an example of a storage unit of the information processing device 10 according to the embodiment. The storage device 110 may includes a storage medium, a recording device which records data on the recording medium, a reading apparatus which reads data from the recording medium, a removing apparatus which removes data recorded in the storage medium, and the like. The storage device 110 is constructed with, for example, a Hard Disk Drive (HDD). The storage device 110 drives the hard disk to store programs executed by the CPU 101 or various data. In addition, in the storage device 110, later-described items, identification numbers, and the like are stored.

The drive 111 is a reader/writer for the storage medium, which is built in or attached to an outer portion of the information processing device 10. The drive 111 reads information recorded in a removable recording medium 24 mounted thereon, such as a magnetic disk, an optical disk, an opto-magnetic disk, or a semiconductor memory, and outputs the information to the RAM 103.

The communication device 112 is, for example, a communication interface which is constructed with a communication device or the like for connection to a communication network 50. In addition, the communication device 112 may be a communication device corresponding to a wireless Local Area Network (LAN), a communication device corresponding to a wireless USB, a wired communication device which performs communication through a wired line.

The image capturing device 20 has a function of capturing an image of a photographic subject by transforming light passing through the photographing lens to an electrical signal by a CCD and converting the analog signal to a digital signal. An image captured by the image capturing device 20 is displayed on a display device. Various sensors 40 are sensors for recognizing the virtual space, and for example, a geomagnetic compass or an acceleration sensor may be exemplified.

[4] Functional Configuration of Information Processing Device

Figure 5:
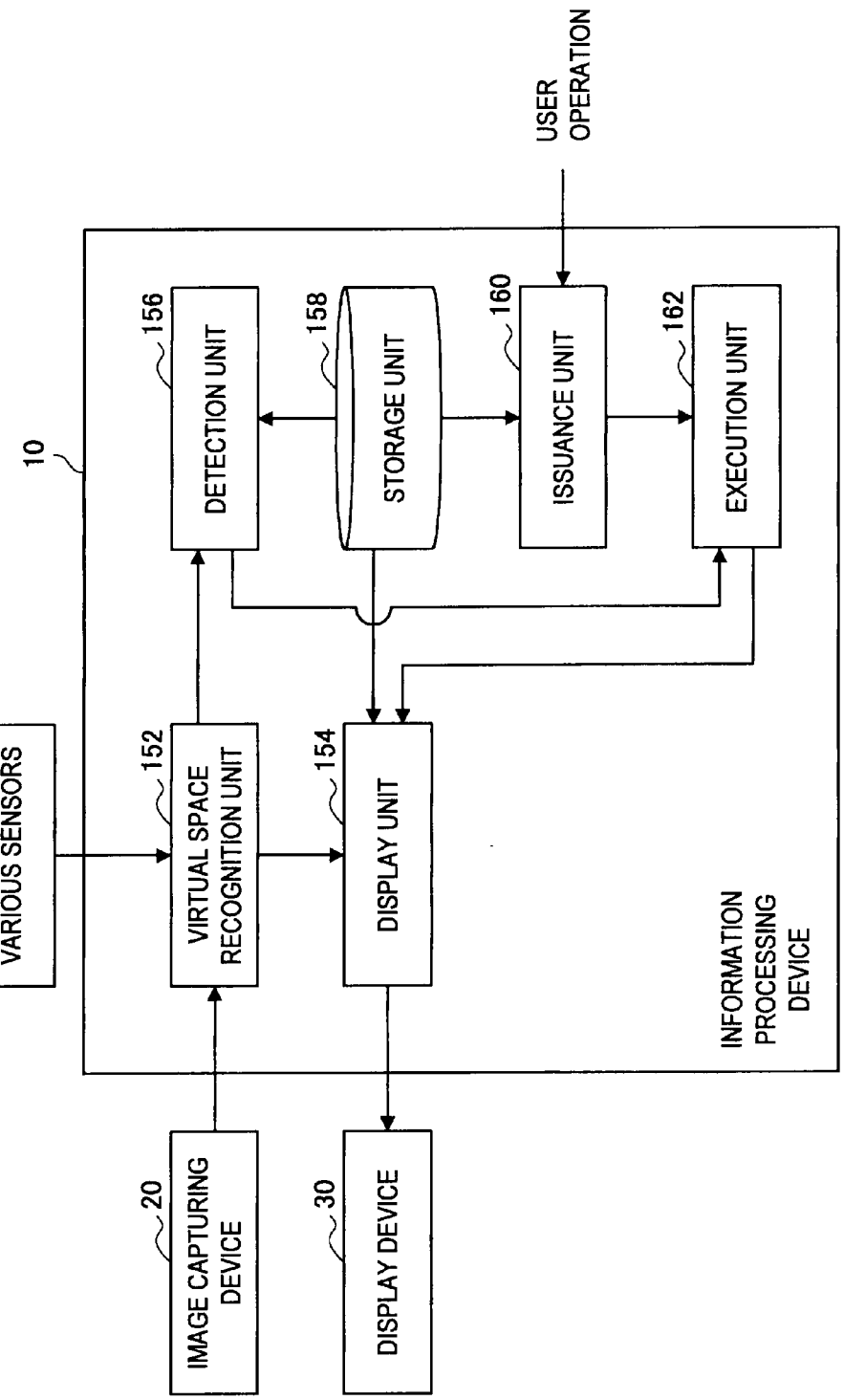
FIG. 5 is a block diagram for illustrating functional configuration of information processing device according to the present embodiment.

Hereinbefore, the hardware configuration of the information processing device 10 was described. Next, the functional configuration of the information processing device 10 according to the embodiment is described with reference to FIG. 5. FIG. 5 is a block diagram illustrating the functional configuration of the information processing device 10 according to the embodiment.

As illustrated in FIG. 5, the information processing device 10 includes a virtual space recognition unit 152, a display unit 154, a detection unit 156, a storage unit 158, an issuance unit 160, an execution unit 162, and the like.

The virtual space recognition unit 152 includes functions for analyzing 3D structure of a real space to recognize a virtual space (AR space). The virtual space recognition unit 152 includes functions for recognizing a position, a posture, a size, or a position of a camera, or the like in the AR space using image of the real space, various sensors such as a geomagnetic compass or an acceleration sensor, GPS, or the like. In other words, the virtual space recognition unit 152 includes a function for superposing a space coordinate system of the virtual space on a space coordinate system of the real space. In addition, the virtual space recognition unit 152 includes a function for detecting device information of the display device 30. The device information of the display device 30 means the device information of the information processing device 10, since the display device 30 and the information processing device 10 are one piece of a device as described above. The device information is position information and posture information, or the like of the display device 30. The position information and the posture information are position information and posture information in the 3D space of the real space analyzed by the virtual space recognition unit 152.

The display unit 154 includes a function for displaying the virtual space recognized by the virtual space recognition unit 152 on the display device 30. The display unit 154 displays objects arranged in the virtual space. Although the display device 30 is configured to be as an one device integrated with the information processing device 10 in the present embodiment, however, the present embodiment does not limited to this example but the display device 30 may be another device different from the information processing device 10.

The detection unit 156 includes a function for detecting correspondence relationship between a position of a device in a virtual space that is recognized by the virtual space recognition unit 152, and a position of an object stored in the storage unit 158. Moreover, the detection unit 156 may detect correspondence relationship of the posture information, in addition to the correspondence relationship of the position information.

The storage unit 158 stores an object (AR object) to be arranged in the virtual space. The storage unit 158 may be a storage medium such as a nonvolatile memory, magnetic disk, optical disk, and MO (Magneto Optical) disk. The nonvolatile memory includes, for example, an EEPROM (Electrically Erasable Programmable Read-Only Memory) and EPROM (Erasable Programmable ROM). The magnetic disk includes a hard disk and disc-like magnetic disk. The optical disk includes a CD (Compact Disc), DVD-R (Digital Versatile Disc Recordable), and BD (Blu-ray Disc (registered trademark)).

Further, the storage unit 158 stores attribute information of the AR objects, such as position information, posture information, size, or the like of each AR object.

The issuance unit 160 includes a function for issuing a command for allowing a later-described execution unit 162 to execute a predetermined processing. The command is to be issued when the user performs any kind of operation with respect to the main body of the information processing device 10. The predetermined processing may be, for example, operations such as operations for shaking, declining, pointing in a direction with respect to the main body of the information processing device 10, operations by GUI, or the like. Moreover, in case of moving the main body of the information processing device 10, the issuance unit 160 may issue a command when moving speed becomes in a certain range. Further, the issuance unit 160 may issue a command depending upon corresponding relationship between a position of the main body of the information processing device 10 and the position of the object.

The issuance unit 160 may issue a command based on the position information of the display device 30 and the AR object. For example, a command may be issued when a distance between the position of the display unit 30 and an arranged position of the AR object becomes within a certain range, or out of a certain range. Moreover, the issuance unit 160 may issue a command when the posture of the display device 30 and the posture of the AR object becomes the same. Further, the issuance unit 160 may issue a command when the position of the display device 30, which can be obtained through GPS information or the like, enters within a specific area, or gets out of a specific area.

The command issued by the issuance unit 160 includes, for example, processing for disposing (inputting) a virtual object in a virtual space, processing for rearranging (moving), or the like. Other example includes processing for removing (outputting) a virtual object from a virtual space, processing for changing the size of the virtual object, or the like.

The execution unit 162 includes a function for executing a certain processing toward the AR object based on device information detected by the detection unit 156. As described above, the device information is information of the AR objects, such as position information, posture information, or the like. A certain processing toward the AR object is, for example, processing such as inputting the AR object to a virtual space, outputting the AR object from the virtual space, or the like. Inputting the AR object to the virtual space means to arrange the AR object in the virtual space. Outputting the AR object from the virtual space means to remove the AR object that has been arranged in the virtual space, from the virtual space. Further, the AR object may be output from the virtual space by displaying the object, which is arranged in the virtual space, on the real space. Further, the object removed from the virtual space may be stored in the information processing device 10 in the size as it removed.

Figure 6:
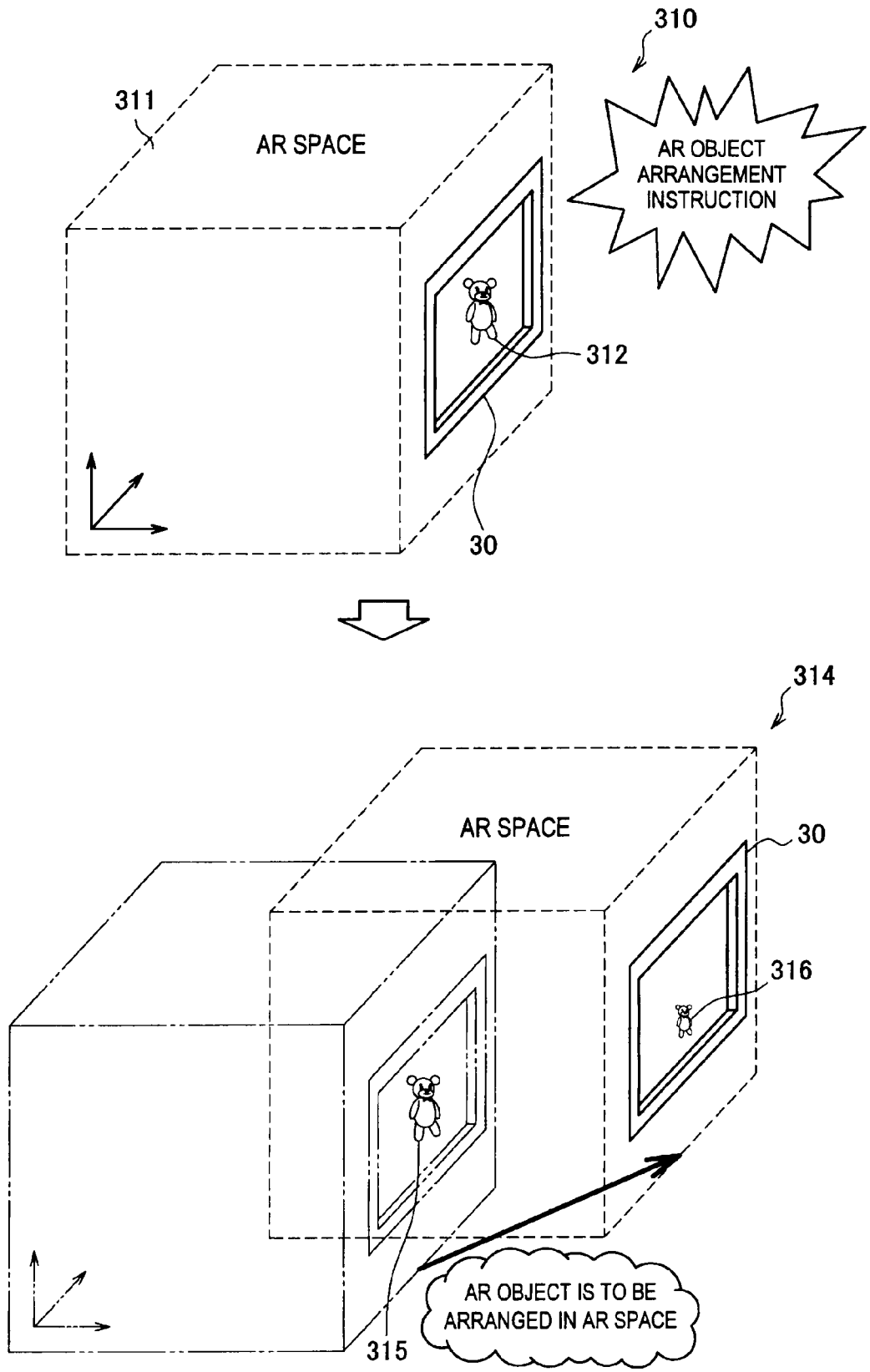
FIG. 6 is a diagram for explaining inputting an AR object according to the present embodiment.

Herein, an explanation will be given on inputting (arrangement) of the AR object by the execution unit 162 with reference to FIG. 6. A diagram 310 in FIG. 6 shows how the AR object is arranged in the AR space. A diagram 312 in FIG. 6 shows the result after the AR object is arranged in the AR space.

As shown in FIG. 6, the diagram 310 shows that there is no AR object in the AR space. An object 312 is an object displayed on the display device 30 in the real space, which is desired to be arranged in the AR space, but which has not been arranged in the AR space yet. At a time when the object 312 is displayed on the display device 30, a position or size of the object to be arranged in the AR space has not been determined yet.

When a command for arranging the object from the real space to the virtual space issued in accordance with the user operation, the object 312 is arranged in the AR space. At this time, a position where the object 312 is arranged in the AR space as an AR object is a position based on a position of the display device 30 in the AR space when the command has been issued. Further, a size of the AR object to be arranged in the AR space is based on a size of the AR object being displayed on the display device 30 at a time when the command has been issued.

For example, to arrange the AR object at the position of the display device 30, the AR object is to be arranged in a size it is displayed on the display device 30. To arrange the AR object at a position different from a device position, the size of the position to be arranged is determined based on the size for displaying at the position of the display device 30 in the AR space, and the AR object will be arranged.

A diagram 314 shows the result of an AR object 315 is arranged in the AR space. The AR object 316 displayed on the display device 30 shows a state of display of the AR object on the display device 30, the AR object which has been arranged in the AR space, on the display device 30, when the display device 30 is moved in the direction of arrow. Thus, the AR object is to be arranged in the AR space at the position of the display device 30 at the time when a command for arranging has been issued to the AR space, and in the size as displayed on the display device 30 at the time when the command for arranging has been issued.

Therefore, if a command is issued triggered by any event, such as that the user shakes the main body of the information processing device 10, or that the user gives an instruction by an operation of GUI, the AR object is arranged in the AR space based on the position information of the display device 30. This makes it possible to arrange the AR object intuitively in the AR space even if the user does not specify the arranged position or size of the AR object.

Subsequently, an explanation will be given on a position or a size of the object in the real space and the AR space with reference to FIG. 7. An object 322 displayed on the display device 30 is an object that is displayed in the real space. The object 322 represents its position and size on a 3D space coordinate system of the real space.

Further, an object 324 is an AR object arranged in the AR space. The position of the object 324 in the AR space is represented on the AR space coordinate system based on the position of the display device 30. Further, the size of the object 324 in the AR space is represented on the AR space coordinate system based on the size of the display screen of the display device 30.

The arranged position of the AR object for the object 322 being displayed in the real space is to be determined at the position of the display device 30 on the AR space coordinate system when an input command into the AR space is issued depending on the user operation. At this time, the position and the size of the object displayed on the display screen of the display device 30 on the real space coordinate system is converted to the position and the size on the AR space coordinate system.

Conversion of position means obtaining the position information of the display device 30 in the AR space that has been analyzed and recognized the 3D structure of the real space by the above-described virtual space recognition unit 152, and setting this position information as the arranged position of the AR object. Conversion of size means obtaining the size on the AR space of the object displaying on the display device 30, and reflecting this size on the object to be arranged on the AR space.

Figure 7:
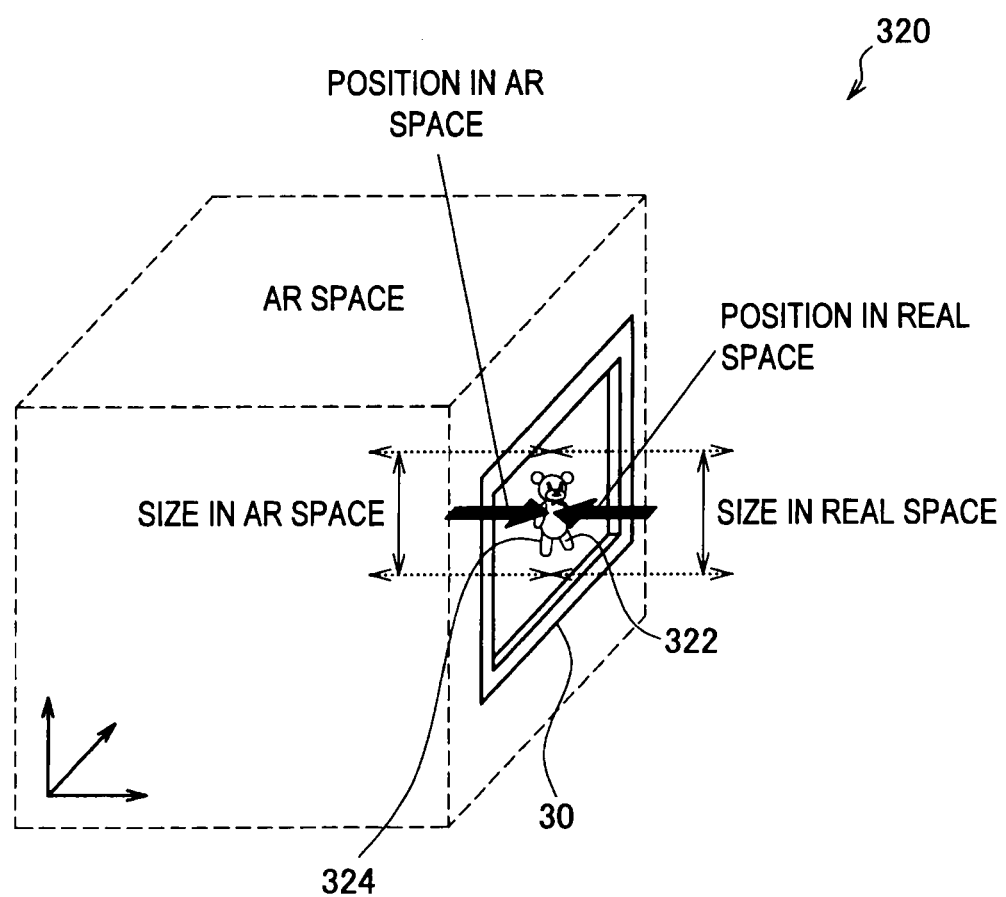
FIG. 7 is a diagram for explaining a position and a size of an object according to the present embodiment.

In FIG. 7, the object 324 is represented on the AR space coordinate system, and a position and a size to be arranged is represented on the AR space coordinate system. The display unit 154 causes the display device 30 to display the AR object arranged on the AR space after being synthesized with video or the like on the real space. FIG. 7 represents a state where the object 322 on the real space is arranged on the AR space, and where the object 324 is arranged on the AR space. That is, the object 322 is represented on the real space coordinate system, and the object 324 is represented on the AR space coordinate system. At the time when the object is arranged on the AR space, it is based on the display position of the display device 30, therefore, the displays of these two objects on the display screen are the same.

Figure 8:
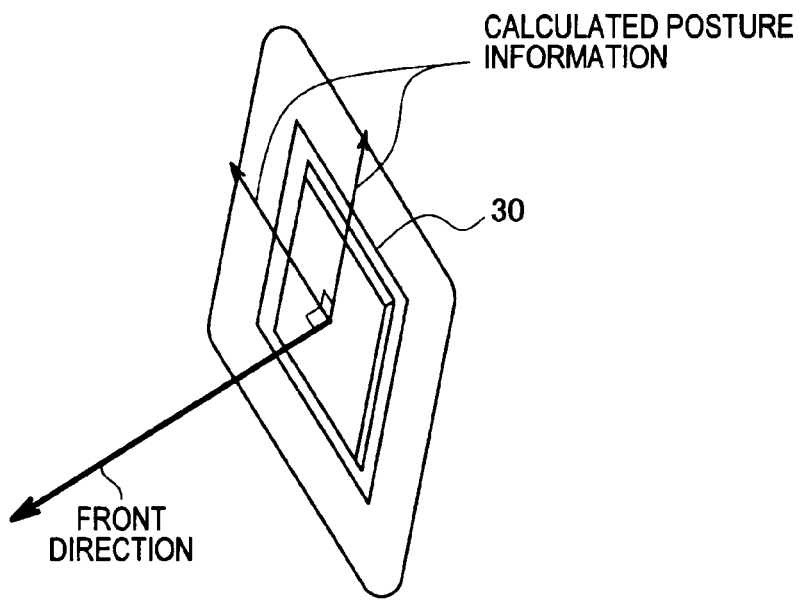
FIG. 8 is a diagram for explaining reflection of posture information of an object according to the present embodiment.

Subsequently, with reference to FIG. 8 and FIG. 9, an explanation will be given on a reflection of posture information of the object to be arranged in the AR space. For example, using video captured by the image capturing device 20, the posture information of the display device 30 may be obtained to be reflected in the AR object. Specifically, as shown in FIG. 8, assuming the front direction of the display device 30 is a vector direction on the AR space, a plane is to be calculated where the vector becomes vertical.

Figure 9:
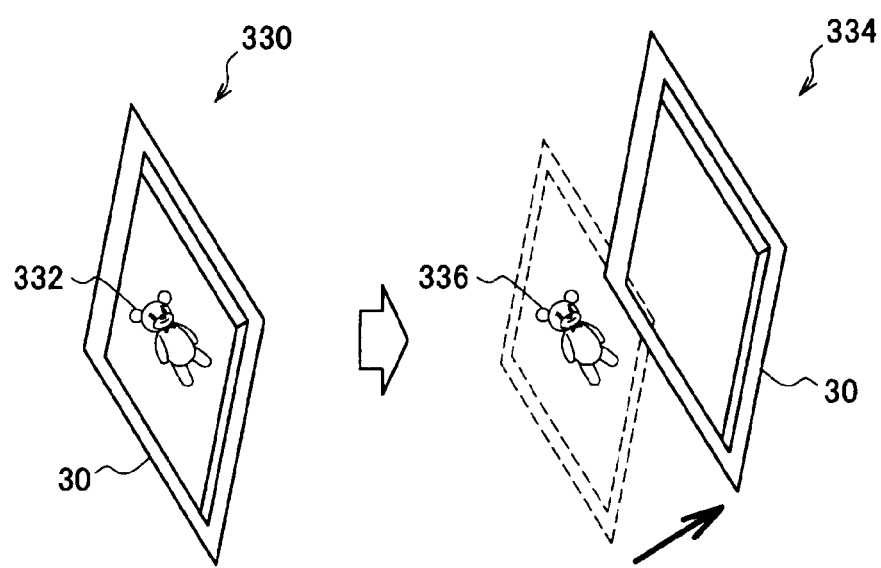
FIG. 9 is a diagram for explaining reflection of posture information of an object according to the present embodiment.

For example, as shown in a diagram 330 in FIG. 9, the object 332 is to be arranged in the AR space while the display device 30 is set on the AR space in a state where the display device 30 is slanted. At this time, the posture information of the display device 30 is to be reflected in the object 332. As shown in a diagram 334 in FIG. 9, an AR object 336 is to be arranged in a state of slant reflecting the posture information of the display device 30.

As described above, inputting (arrangement) of the AR object by the execution unit 162 has been explained. In the above explanation, the AR object is arranged in the AR space based on the position of the display device 30, however, the present embodiment is not limited to such example, but may be based on a position of the image capturing device 20. For example, a position in a certain distance in the front direction from the position of the image capturing device 20 may be a position where the AR object is to be arranged.

Figure 10:
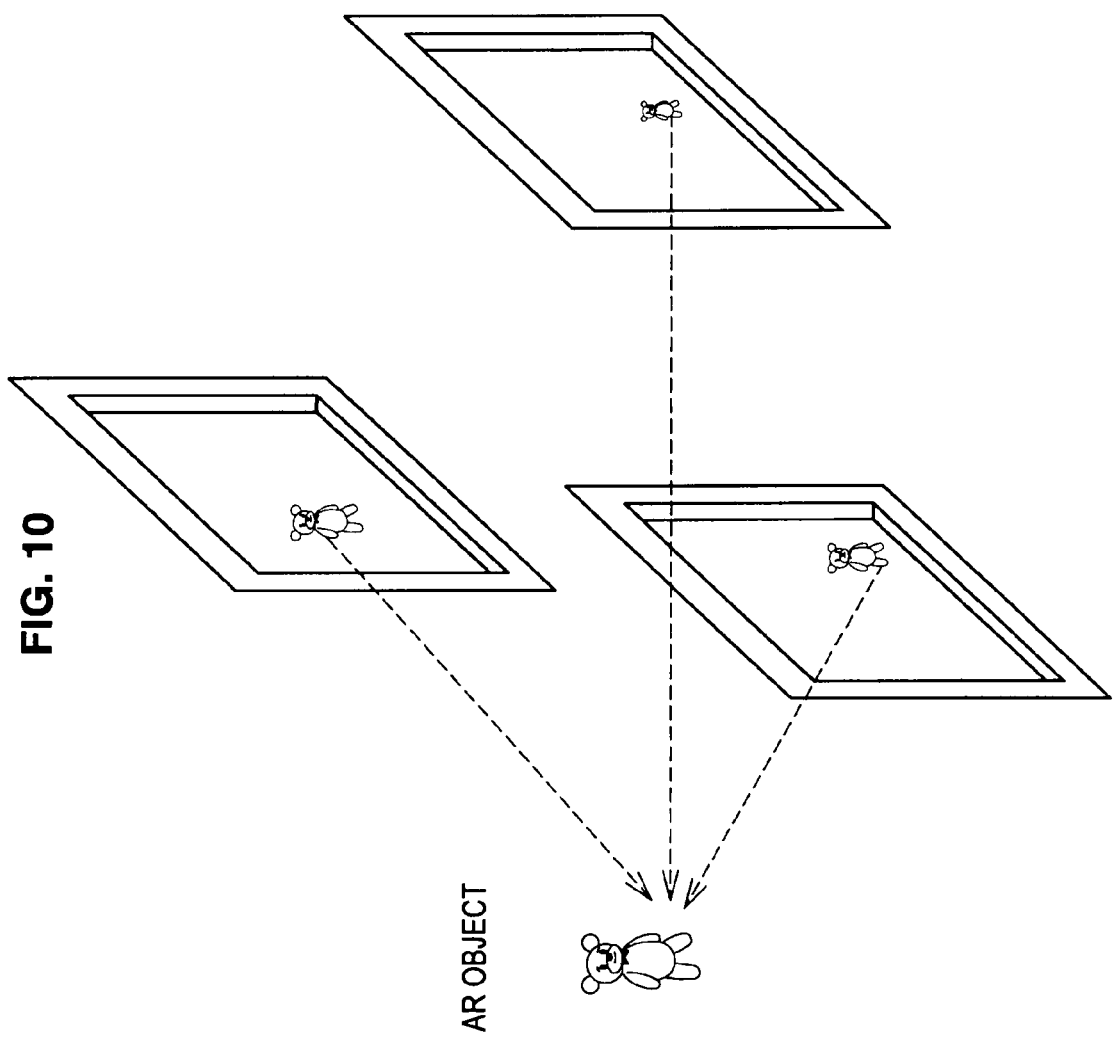
FIG. 10 is a diagram for explaining displaying an AR object arranged in an AR space according to the present embodiment.

Subsequently, with reference to FIG. 10 to FIG. 14, an explanation will be given on outputting (removing from the AR space) a virtual object by the execution unit 162. FIG. 10 is a diagram for explaining displaying an AR object arranged in the AR space. A shown in FIG. 10, the AR object is arranged on the AR space and the AR object is displayed on the display device 30. The AR object displayed on the AR space coordinate system varies its display on the display device 30 in accordance with a position relation of the display device 30 (the image capturing device 20).

For example, if the display device 30 locates in the right direction to the arranged position of the AR object, the AR object is to be displayed on the left side of the display screen. As the display device 30 separates from the arranged position of the AR object, the AR object is displayed in a smaller size on the display screen. Thus, the AR object arranged on the AR space coordinate system is to be displayed spatially on the display screen of the display device 30.

Figure 11:
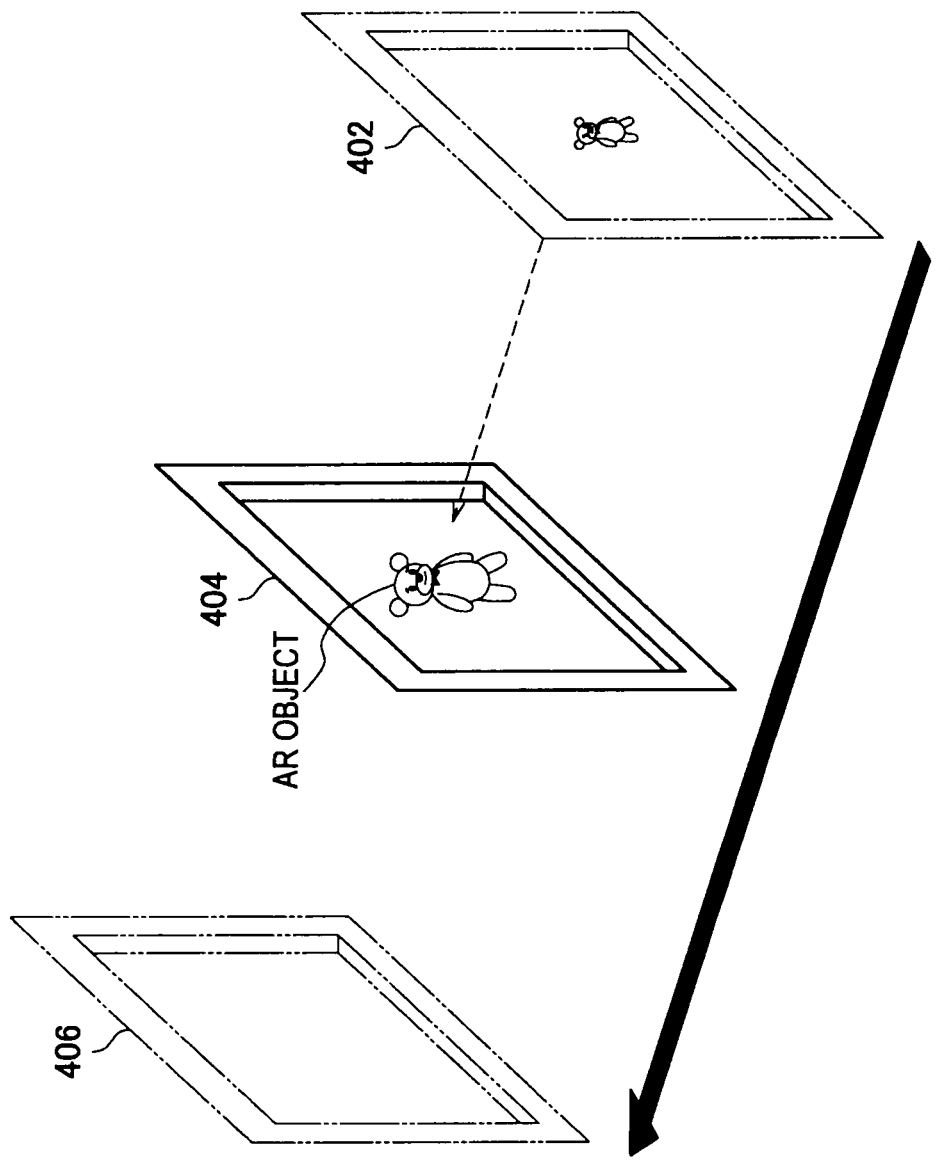
FIG. 11 is a diagram for explaining outputting an AR object in an AR space according to the present embodiment.

Subsequently, an explanation will be given on outputting the AR object in the AR space with reference to FIG. 11. FIG. 11 shows a state where the AR object is removed when the position of the AR object in the AR space and the position of the display device 30 (the image capturing device 20) on the AR space become identical. As shown in FIG. 11, the display device 30 locates at a position 402 different from the position where the AR object is arranged.

The display device 30 moves to a position 404, and the position of the display device 30 and the position of the AR object become identical. At this time, a command for removing the AR object from the AR space is issued by the issuance unit 160. When the position of the display device 30 transfers the position where the AR object is arranged and moves to a position 406, the AR object is removed from the AR space.

If the AR object is output (removed) from the AR space, the output size of the AR object becomes a size of the AR object at a position in the AR space when the positions of AR object and the display device 30 become identical. Outputting the AR object means, as illustrated in FIG. 11, removing the AR object from the display screen, or picking pup the AR object from the AR space to the real space, or the like.

Here, with reference to FIG. 12 to FIG. 14, an explanation will be given on obtaining the AR object. Obtaining the AR object means picking up (outputting) the AR object in the AR space to the real space.

Figure 12:
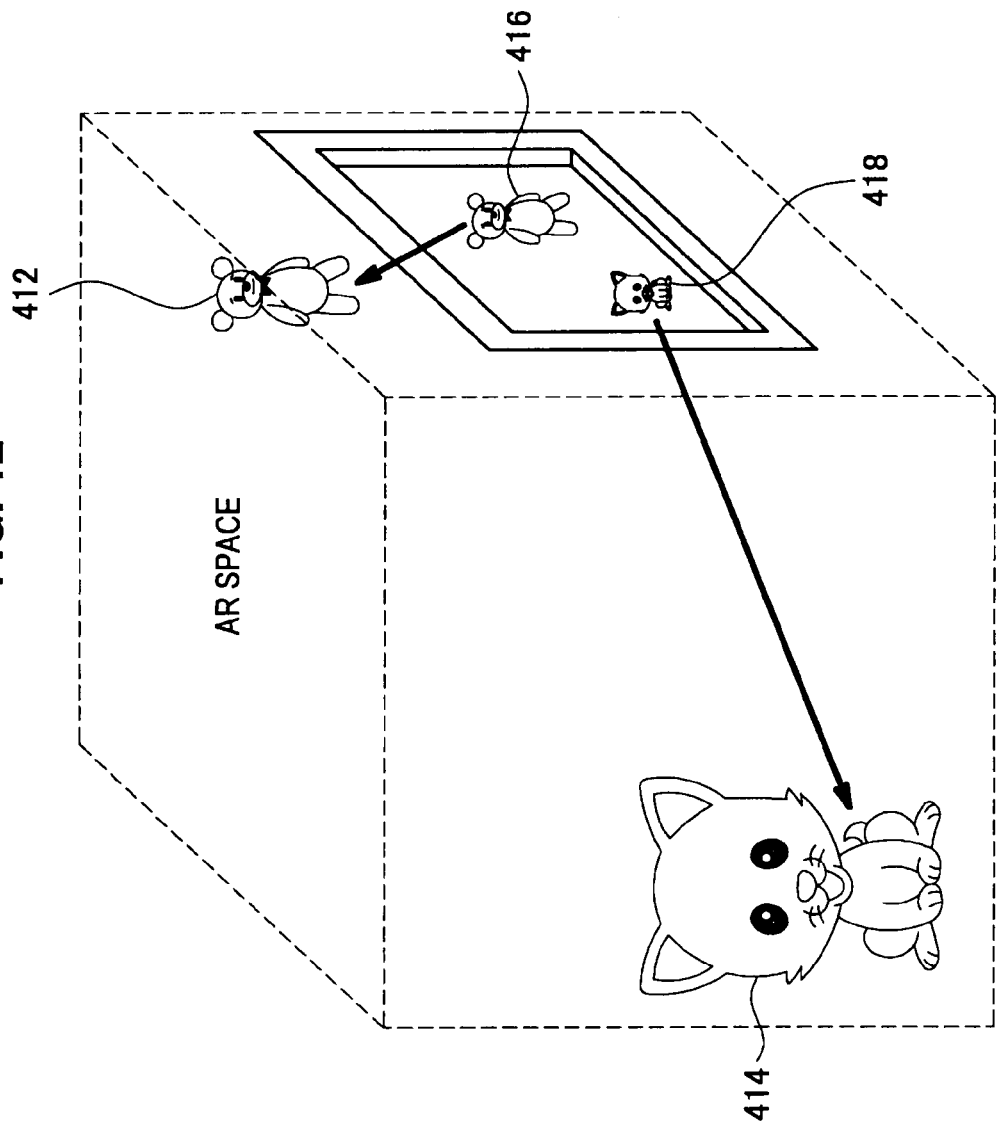
FIG. 12 is a diagram for explaining obtaining an AR object according to the present embodiment.
Figure 13:
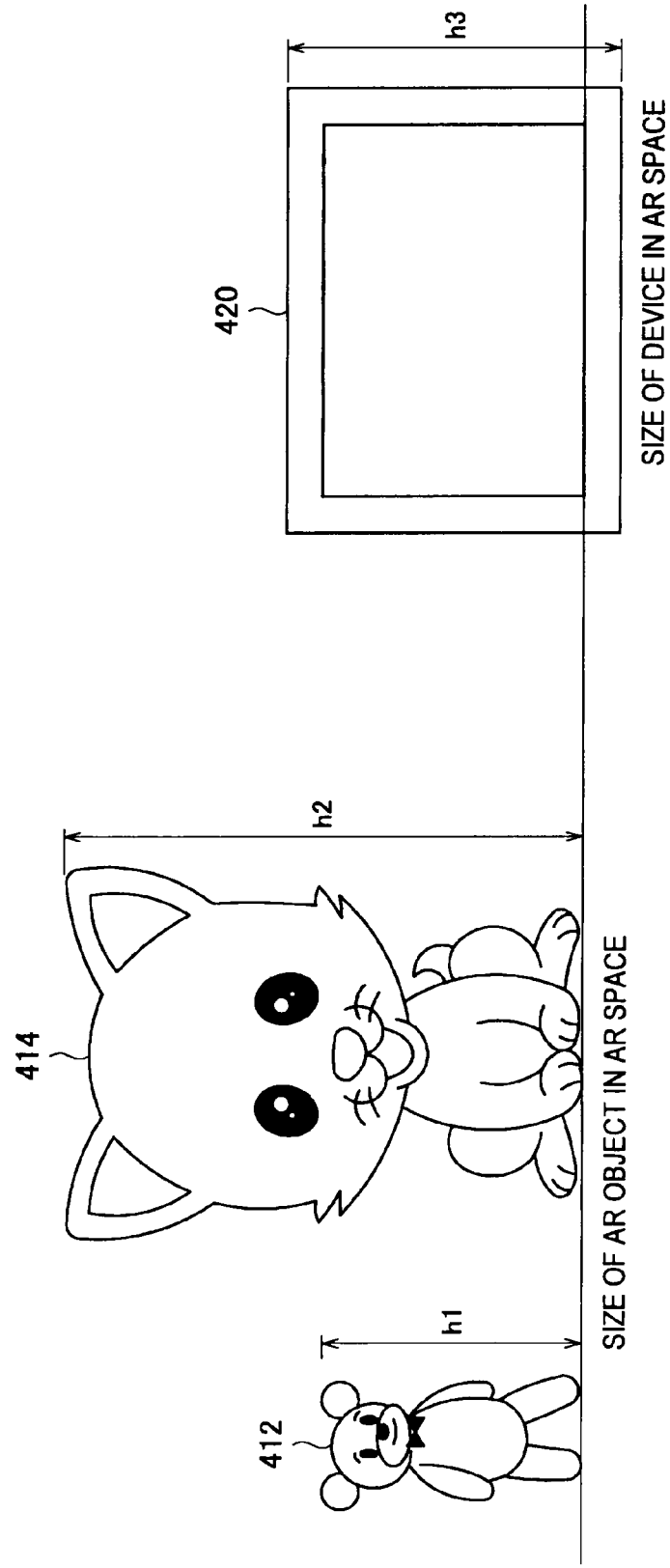
FIG. 13 is a diagram for explaining obtaining an AR object according to the present embodiment.

As illustrated in FIG. 12, objects 412 and 414 are arranged in the AR space. Moreover, the state of displaying the object 412 on the display screen is represented by a display 416, and the state of displaying the object 414 on the display screen is represented by a display 418. In FIG. 13, sizes of the objects 412 and 414, and the display screen 420 of the display device 30 are shown. As shown in FIG. 13, the size of the object 412 is assumed to be double of a size h2 of the object 414. Further, a size h1 of the object 412 and a size h3 of the display screen 420 are assumed to be the same.

As illustrated in FIG. 12, on the display screen of the display device 30, the AR object on the AR space is displayed. For this reason, depending upon a distance between the device and the AR object, an object distant from the display screen is displayed in small, and an object close to the display screen is displayed in large. Since the object 414 is more distant form the display screen than the object 412 on the AR space, the display 418 of the display 414 is displayed in smaller than the display 416 of the object 412 on the display screen.

Next, an explanation will be given on obtaining objects in the position relation as illustrated in FIG. 12. A display example 430 in FIG. 14 illustrates results after obtaining (outputting) each of two objects in the relationship shown in FIG. 12 in each position. In the display example 430, the obtained objects 412 and 414 are displayed. The obtaining size of the objects 412 and 411 is the size of the AR object illustrated in FIG. 13. That is, the size of the objects 412 and 414 that are obtained from the AR space is a size based on a size of the display screen. Therefore, since the object 412 is same in size as the display screen and the object 414 is double in size as the display screen, a half of the object 414 is left on the display screen.

Further, as illustrated in the display example 436, a size based on a size of any object, and the size of the screen may be a basis for displaying. To arrange the object in the AR space once again by using the object obtained from the AR space to the real space, the object is to be arranged in the same size as the size of the object before obtained (output). That is, to arranging (inputting) the object in the AR space or obtaining (outputting) the object from the AR space, the inputting or outputting is done in an absolute size of the AR object. Moreover, inputting or outputting may be done in a size based on the absolute size.

As described above, obtaining the AR object has been explained. According to the information processing device 10, an input position or an output position of the AR object is to be determined based on the position of the display device 30, comparing positions of the display device 30 and the AR object in the AR space. This makes it possible to intuitively arrange or remove the AR object on the AR space.

[5] Details of Operations of Information Processing Device

Figure 15:
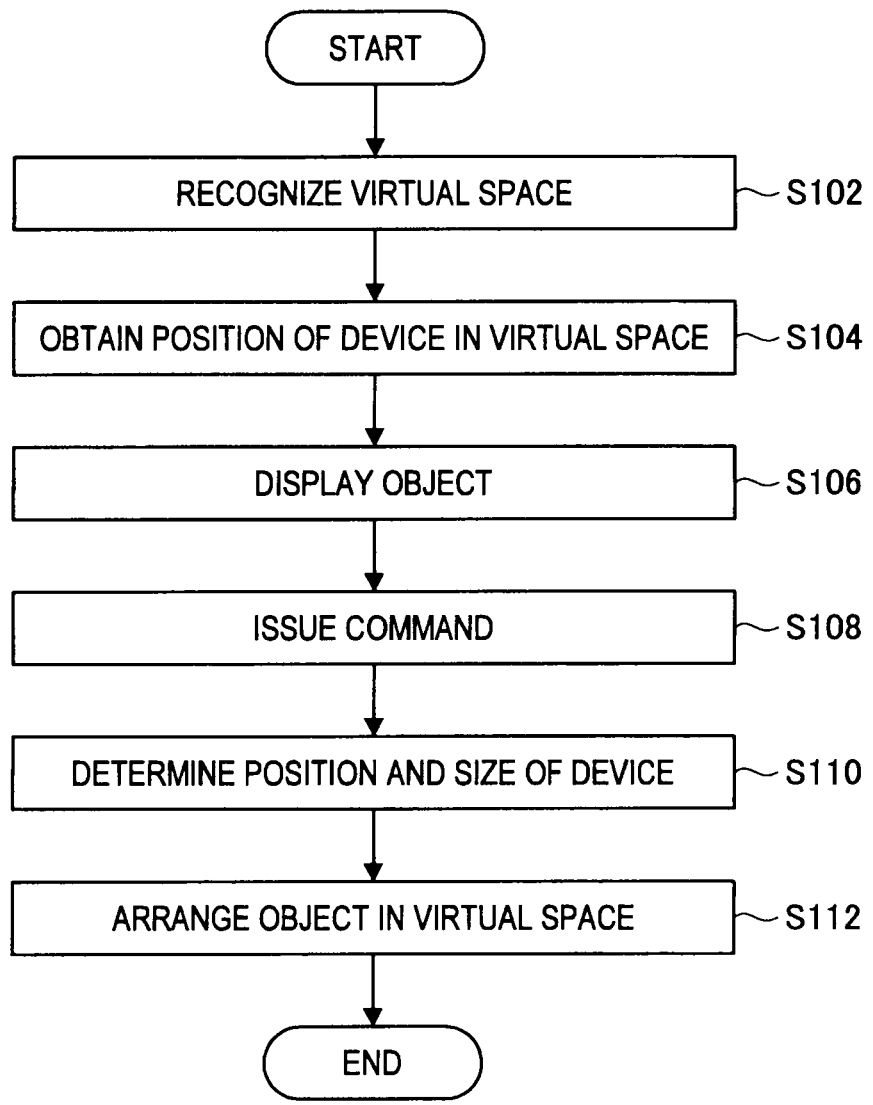
FIG. 15 is a flowchart for indicating input processing of an AR object according to the present embodiment.
Figure 16:
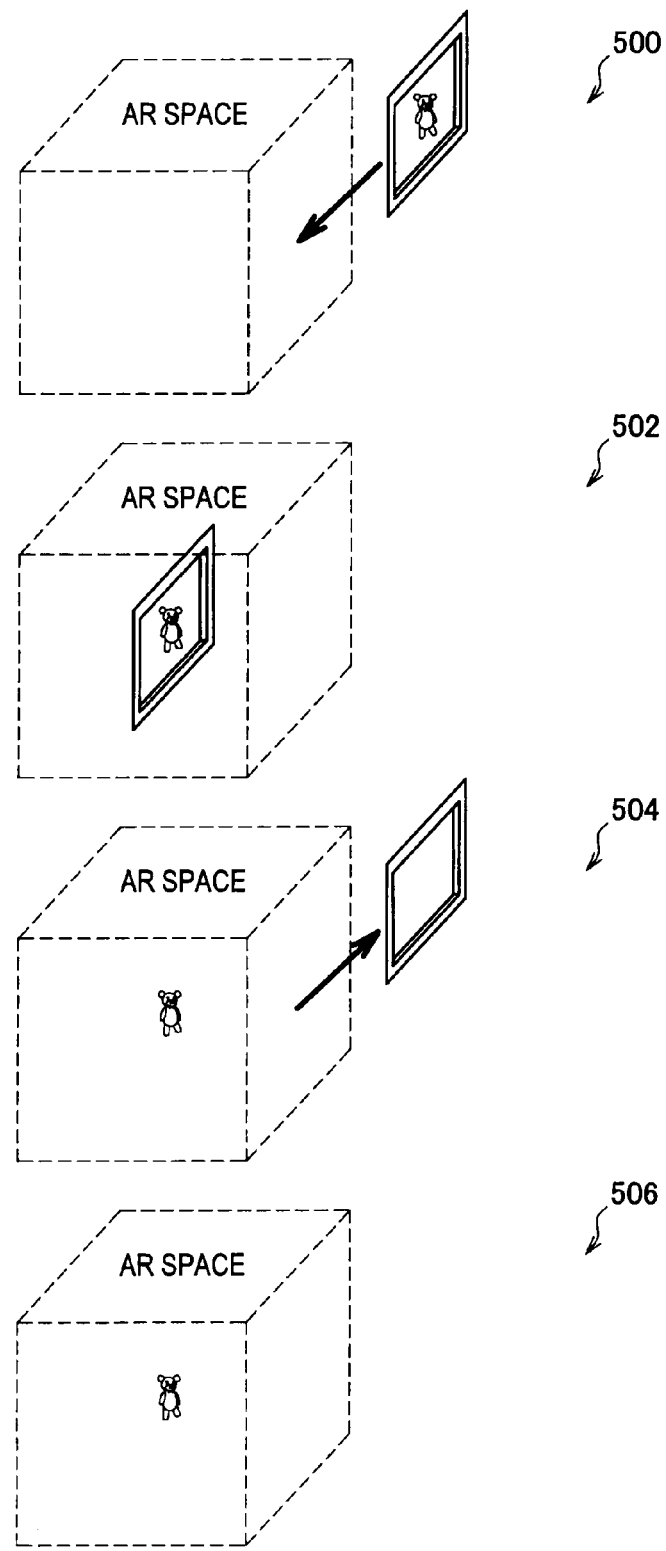
FIG. 16 is a diagram for explaining input processing of an AR object according to the present embodiment.

As described above, the functional configuration of the information processing device 10 has been explained. Next, with reference to FIG. 15 to FIG. 18, the details operation of the information processing device 10 will be explained. With reference to FIG. 15 and FIG. 16, an explanation will be given on an input processing for the AR object in the information processing device 10. As illustrated in FIG. 15, the virtual space recognition unit 152 analyzes 3D space structure of the real space to recognize the virtual space (the AR space) (S102), and obtains a position on the virtual space (S104).

Subsequently, the detection unit 156 detects a corresponding relationship between the position of the information processing device and the position of the object to display the object to be arranged in the virtual space on the display screen of the display device 30 (S106). Displaying the object in step S106 may be obtaining an object stored in the storage unit 158 depending upon the user operation, or the display unit 154 may display an arbitrary object on the display screen.

Subsequently, the issuance unit 160 issues a command for arranging the object depending upon the user operation (S108). In step S108, if the user shakes the main body of the information processing device 10, slants it, faces it to a certain direction, or operates it by GUI, the issuance unit 160 issues the command for arranging. Further, the issuance unit 160 may issue the command for arranging when the distance between the position of the display device 30 and the arranged position of the AR object becomes within a certain range.

The execution unit 162 determines the size of the object to be arranged in the virtual space (S110). Note that as for the position to be arranged, a position of the information processing device 10 in the virtual space is obtained from the virtual space recognition unit 152. The position and the size of the object determined in steps 110 is to be determined based on the size of the position of the display device 30 and the display screen, as described above. Thus, the object will be arranged at the position and in the size in the virtual space that has been determined in step S110.

As described above, since the position and the size of the object to be arranged in the virtual space is determined based on the position of the display device 30 and the size of the display screen, it is possible to arrange the object in the virtual space intuitively although the user does not specify the position or the size of the object explicitly.

Here, to easily understand the input processing of the object in the information processing device 10, an explanation will be given on the input processing of the object with reference to a diagram in FIG. 16. As illustrated in the diagram 500 in FIG. 16, after recognizing the virtual space (the AR space), the display device 30 (the main body of the information processing device 10) is moved to the position where the object in the AR space is desired to be input (arranged).

Subsequently, as illustrated in a diagram 502, a command for arranging is issued at a position where the object is desired to be input, and the object is about to be arranged in the AR space. Then, as illustrated in diagrams 504 and 506, the object is to be arranged in the AR space. Thus, since the object is arranged based on the position relation with the display device 30, even if the user does not specify the arranged position in the AR space or the size for arranging, the object can be arranged in the AR space at an appropriate position and in an appropriate size.

Figure 17:
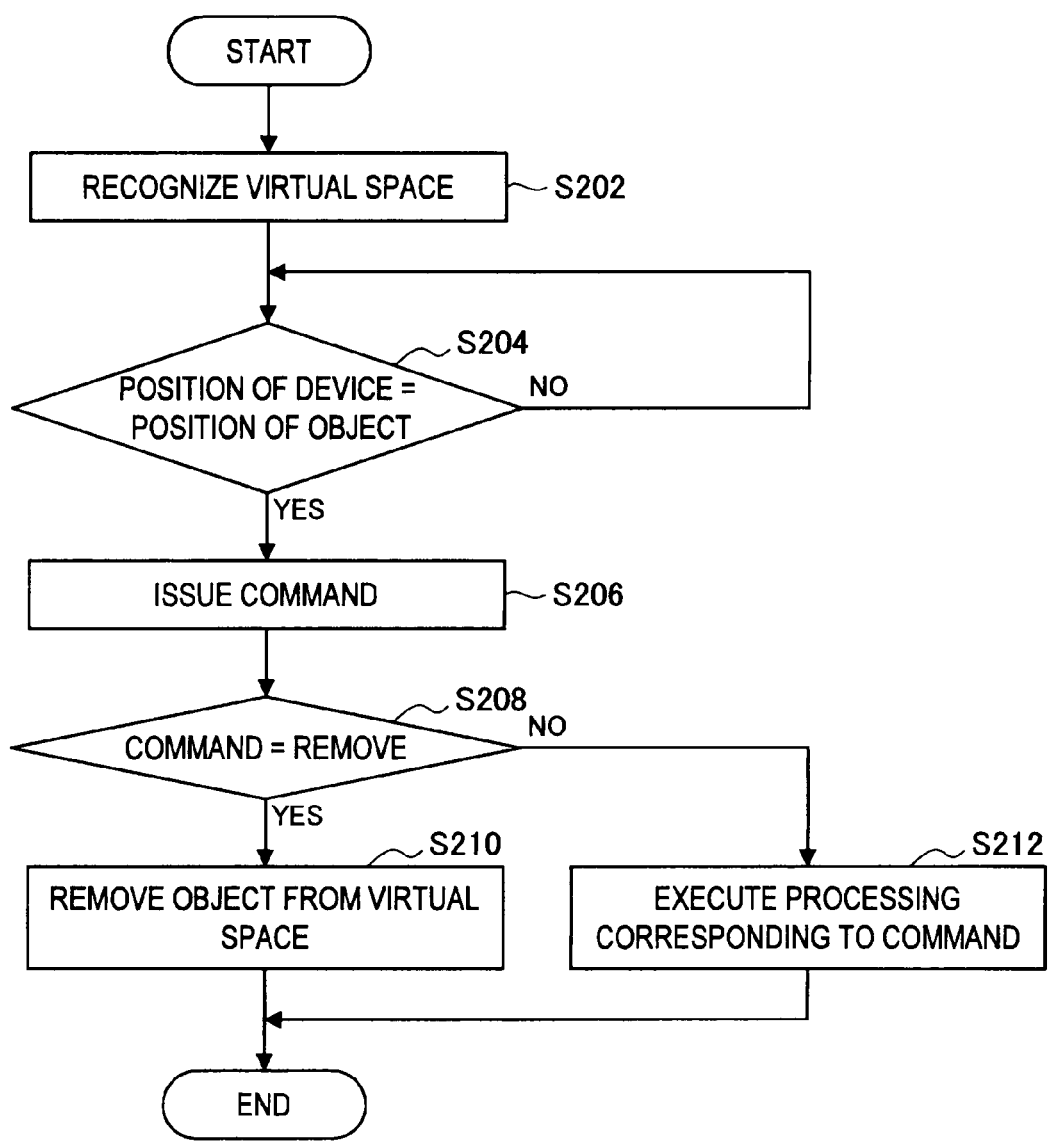
FIG. 17 is a flowchart for indicating output processing of an AR object according to the present embodiment.
Figure 18:
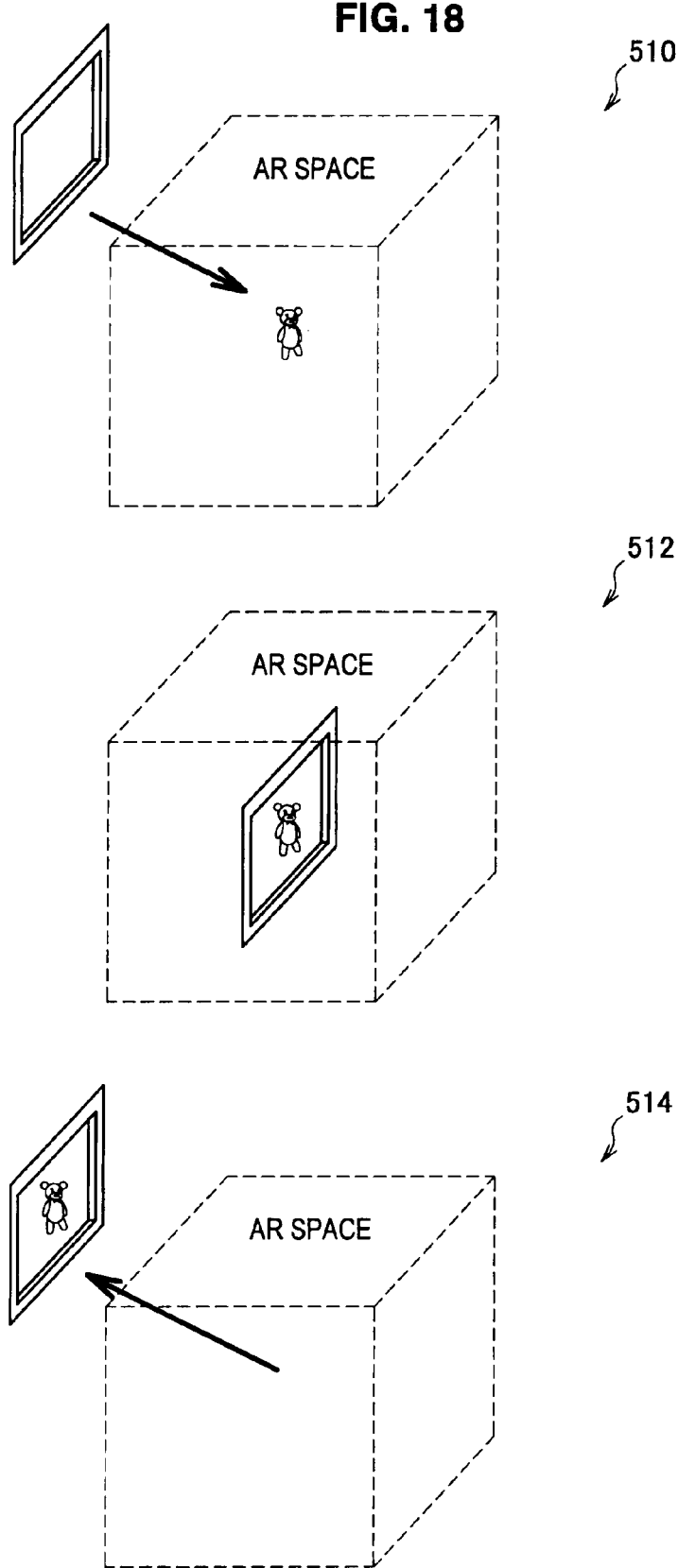
FIG. 18 is a diagram for explaining output processing or an AR object according to the present embodiment.

An explanation will be given on the outputting processing the AR object in the information processing device 10 with reference to FIG. 17 and FIG. 18. As illustrated in FIG. 17, the virtual space recognition unit 152 firstly analyzes 3D space structure of a real space and recognize the virtual space (the AR space) (S202). Then the virtual space recognition unit 152 determines whether the device position (the position of the display device 30) and the position of the object are identical (S204).

If the position of the display device 30 and the position of the object are identical in step S204, the issuance unit 160 issues a command (S206). When the position of the display device 30 and the position of the object are identical in step S206, a command is issued, however, the present embodiment is not limited to such example. For example, when the positions of the display device 30 and the object becomes within a certain range, the issuance unit 160 may issue the command. A user operation may trigger issuance of the command. If the positions of the display device 30 and the object are determined not to be identical in step S204, the determination processing of step S204 will be repeated.

The execution unit 162 determines whether the command issued by the issuance unit 160 in step S206 is a command for removing an object (S208). If the issued command is determined to be the command for removing the object in step S208, the execution unit 162 removes the object from the virtual space (S210).

If the issued command is determined to be a command other than the command for removing the object in step S208, processing corresponding to the command is executed. The command other than the command for removing the object is a command, such as the command for arranging, the command for rearranging, or the like, as described above.

Here, to easily understand the output processing of the object in the information processing device 10, an explanation will be given on the output processing of the object with reference to a diagram in FIG. 18. A diagram 510 in FIG. 18 illustrates a state where an object is arranged in the AR space and the display device 30 is moved to the arranged position of the object.

Diagrams 512 and 514 illustrates a state where a command for outputting object is issued, the object arranged in the AR space is output in the real space, and the information processing device 10 obtains the object. A described above, when the object arranged in the AR space is output to the real space, the object is to be displayed in a size in the AR space on the display screen of the display device 30 based on the size of the display screen of the display device 30. Thus, in a case of removing the object from the AR space, since the object is displayed on the real space based on the position relation with the display device 30 and the size of the display screen of the display device 30, the object can be output in the real space in an appropriate size without specifying the size for outputting.

It should be understood by those skilled in the art that various modifications, combinations, sub-combinations and alterations may occur depending on design requirements and other factors insofar as they are within the scope of the appended claims or the equivalents thereof.

For example, the steps in the process of the information processing device 10 described in the specification may not necessarily performed in time sequence according to the order disclosed as the flowchart. In other words, the steps in the process of the information processing device 10 may be performed in parallel in a different process.

In addition, the hardware such as a CPU, a ROM, and a RAM built in the information processing device 10 or the like may also be implemented by computer programs exhibiting the functions equivalent to those of the components of the aforementioned information processing device 10. In addition, a storage medium storing the computer programs is also provided.

The present application contains subject matter related to that disclosed in Japanese Priority Patent Application JP 2010-048095 filed in the Japan Patent Office on Mar. 4, 2010, the entire content of which is hereby incorporated by reference.

What is claimed is:

1. An information processing device comprising:
    circuitry configured as:
    a virtual space recognition unit for analyzing 3D space structure of a real space to recognize a virtual space, and for obtaining position information of a device in the virtual space;
    a storage unit for storing an object to be arranged in the virtual space and position information of the object;
    a display unit for displaying the object arranged in the virtual space on a display device at an initial location based on a size of the object and a size of the display device such that the size of the object is made small enough such that an entire area of the object is displayed on the display device at the initial location;
    a detection unit for detecting device information of the display device;
    an execution unit for executing predetermined processing toward the object based on the device information; and
    an issuance unit that issues a command based on satisfying at least one of: a first condition when a moving speed of the information processing device falls within a predetermined range of speeds; and a second condition when a distance between the display device and the object to be arranged in the virtual space falls within a predetermined range of distances,
    wherein the command removes the object from the virtual space and the object is obtained by the information processing device to be output on the display device based on a positional relationship with the display device and the size of the display device, the outputting being performed independently of specifying the size of the object.

2. The information processing device according to claim 1, wherein the detection unit detects correspondence relationship between the position information in the virtual space obtained by the virtual space recognition unit, and the position information of the object stored in the storage unit, and the execution unit executes predetermined processing toward the object depending upon a state of the correspondence relationship detected by the detection unit.

3. The information processing device according to claim 1, wherein the issuance unit issues a command to cause the execution unit to execute predetermined processing depending upon a user's operation, wherein the execution unit executes the predetermined processing depending upon the command issued by the issuance unit.

4. The information processing device according to claim 3, wherein the execution unit outputs the object, which has been input in the virtual space, from the virtual space based on the device information.

5. The information processing device according to claim 1, wherein the execution unit inputs the object in the virtual space based on the device information.

6. The information processing device according to claim 5, wherein the execution unit inputs the object in the virtual space by arranging the object in the virtual space.

7. The information processing device according to claim 6, wherein the detection unit detects posture information of the display device on the virtual space, and the execution unit arranges the object in that the posture information of the display device has been reflected, in the virtual space.

8. The information processing device according to claim 7, wherein the execution unit outputs the object from the virtual space by removing the object arranged in the virtual space from the virtual space.

9. The information processing device according to claim 8, wherein the execution unit outputs the object from the virtual space by displaying the object arranged in the virtual space, in a predetermined size in the real space.

10. The information processing device according to claim 9, wherein the execution unit displays the object arranged in the virtual space, in the real space in a size corresponding to a size in the virtual space.

11. The information processing device according to claim 1, wherein the execution unit removes the object from the display device if the display device is moved such that a distance between the object and the display device is zero.

12. The information processing device according to claim 1, wherein the display unit displays multiple objects at the initial location based on a size of the multiple objects and the size of the display device an entire area of each object is displayed on the display device at the initial location.

13. An information processing method of operating an information processing device, comprising:
    analyzing, via processing circuitry of the information processing device, a 3D space structure of a real space to recognize a virtual space;
    arranging an object in the virtual space at an initial location based on a size of the object and a size of a display device that displays the virtual space such that the size of the object is made small enough such that an entire area of the object is displayed on the display device at the initial location;
    detecting a device information of the display device;
    executing predetermined processing toward the object based on the device information; and issuing a command based on satisfying at least one of: a first condition when a moving speed of the information processing device falls within a predetermined range of speeds; and a second condition when a distance between the display device and the object in the virtual space falls within a predetermined range of distances,
    wherein the command removes the object from the virtual space and the object is obtained by the information processing device to be output on the display device based on a positional relationship with the display device and the size of the display device, the outputting being performed independently of specifying the size of the object.

14. A non-transitory computer readable medium recorded with a program causing an information processing device to perform a method comprising:

analyzing 3D space structure of a real space to recognize a virtual space;

calculating position information of a device;

storing an object to be arranged in the virtual space;

displaying the object arranged in the virtual space on a display device at an initial location based on a size of the object and a size of the display device such that the size of the object is made small enough such that an entire area of the object is displayed on the display device at the initial location;

detecting a correspondence relationship between a position of the object to be arranged in the virtual space and a position of the device;

executing predetermined processing toward the object based on the device information; and issuing a command based on satisfying at least one of: a first condition when a moving speed of the information processing device falls within a predetermined range of speeds; and a second condition when a distance between the display device and the object to be arranged in the virtual space falls within a predetermined range of distances, wherein the command removes the object from the virtual space and the object is obtained by the information processing device to be output on the display device based on a positional relationship with the display device and the size of the display device, the outputting being performed independently of specifying the size of the object.

* * * * *